Jan. 22, 1929.
J. L. LANGE
LATCH HOOK DEVICE
Filed June 6, 1928
1,699,975
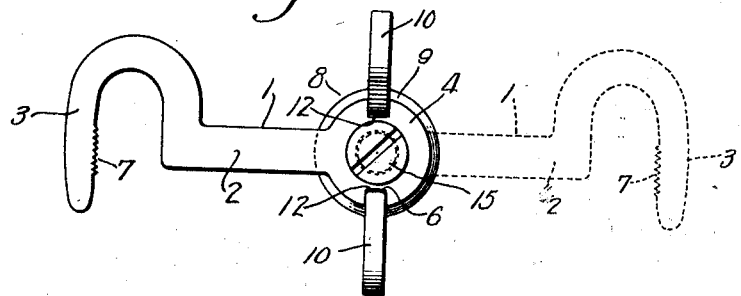
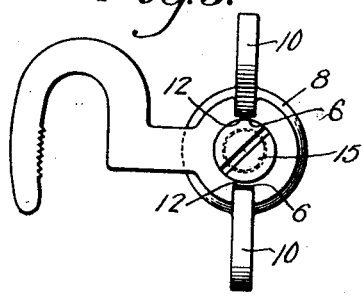
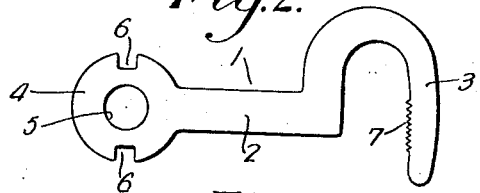
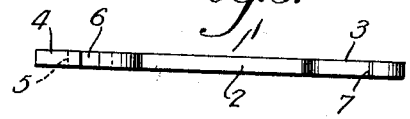
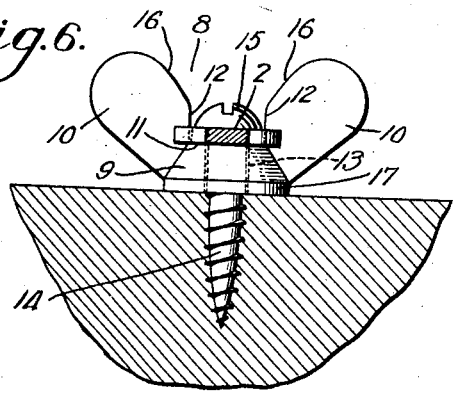
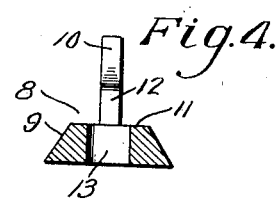
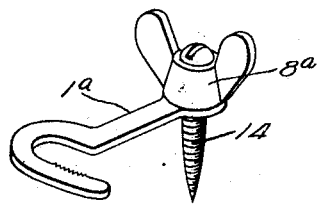
INVENTOR
John Louis Lange.
BY
ATTORNEYS Patented Jan. 22, 1929.

1,699,975

UNITED STATES PATENT OFFICE.

JOHN LOUIS LANGE, OF DUMONT, NEW JERSEY.

LATCH-HOOK DEVICE.

Application filed June 6, 1928. Serial No. 283,327.

An important object of the present invention is to provide an improved pivoted latch hook device adapted to be attached to a door, screen or the like and provided with means to facilitate the turning of the hook into and out of engagement with a keeper.

Another object of the invention is to provide a latch hook device of the above mentioned character wherein the hook is adapted to be reversed to engage a keeper located at either side of its pivot.

Other objects of the invention will appear hereinafter.

In the drawing:

Fig. 1 is a plan view of the latch hook device showing the hook, the reversal of the hook being indicated in dotted lines;

Fig. 2 a plan view of the hook member detached from its hub or turning member;

Fig. 3 an edge view of the hook member;

Fig. 4 a sectional view of the hub member;

Fig. 5 a plan view of the device provided with a hook member of different proportions;

Fig. 6 a side view of the assembled device showing it pivotally mounted upon a support, the latter and the hook shank being in section; and Fig. 7 a perspective view of a modified form of the device.

The device comprises a hook member 1 which is formed of a flat sheet metal stamping shaped to provide the member with a shank 2, a hook end 3 and a disk-like hub portion 4. The hub portion is formed with a central aperture 5 and with two peripheral notches 6. The latter are located at diametrically opposite points upon a line at right angles to the direction of the shank 2. The inner edge of the hook end 3 adjacent the extremity thereof is formed with a short row of teeth or serrations 7.

For turning the hook member 1 a hub-member 8 is provided. This member 8 is similar to a winged nut in form being provided with a conical central portion 9 and wings 10 which extend outward at diametrically opposite sides of the central portion and outward also from one end face 11 of the latter. The end face 11 is flat and forms a seat for the flat hub portion 4 of the hook member. The inner edges of the wings 10 extend straight out parallel to each other from the opposite edges of said seat as at 12 and are adapted to be received in the notches 6 of the hook member. The central portion of the hub member is formed with a central aperture or bore 13 for receiving a pivot screw and when the hub portion of the hook member is seated upon the face 11 with the wing edges 12 received in the notches 6 the aperture 5 of the hook member registers with the aperture 12 in the hub member and said members are keyed to rotate together. A pivot screw 13 is passed through the registering apertures 6 and 12. This screw is provided with a head 15 which bears against the hub portion 4 of the hook members and the opposite threaded end of the screw extends out beyond the hub member to pivotally attach the assembled members to a support. In the present instance this screw is a pointed wood screw for conveniently attaching the device to a door or screen. It may, however, be of any suitable form.

The inner edges of the hub wings 10 flare outwardly beyond the straight portions 12 thereof as at 16 to facilitate the engagement of the wing edges with the notches 6 and the mounting of the hook member upon the hub member. When the screw 14 is inserted through the assembled members a washer 17 is placed upon its threaded end and said end is screwed into a support to a proper degree to hold the two members locked together and still permit them to be rotated. The hook member is then supported offset from the surface of the support. This is an advantage as it permits the hook end 3 to readily engage a standard screw keeper having an eye or closed loop whose aperture is of necessity offset outwardly. The small teeth 7 enable the hook to make a more secure engagement with the keeper, and the spreading wings of the turning member provide a good purchase for the breaking of said engagement when desired. The registering apertures 6 and 12 of the hook member and the hub member are unthreaded and smooth so that the said members may be turned freely upon the pivot screw 13 by means of the wings 10.

In Fig. 1 the hook member 1 is shown in full lines as mounted upon the hub member 8 for engagement with a keeper at the left of the pivot. In dotted lines it is shown as adjusted for engagement with a keeper located at the right of the pivot. The flat form of the hook member, the arrangement of its notches 6, and the cooperating form of the hub member 8 enable this adjustment to be made by removing the screw, reversing the hook member and reseating it and replacing the screw.

In Fig. 6 is shown a much shorter hook member mounted upon the hub member 8 for use in places of limited clearance. This hook member is otherwise formed precisely like the longer one and is interchangeable with it. Hook members in a variety of sizes may be made for assembly with hub members 8 of a standard size.

In Fig. 7 is shown a modified form of the latch hook device. Here a hook member 1ª is permanently fixed at one end to the base of the hub member 8ª and adapted to be turned by it. The hub member is of the conventional winged nut form and is adapted to turn upon the screw 13.

While I have shown and described several practical and highly desirable forms of my invention I do not wish to be limited strictly to this disclosure, but reserve the right to make such changes as will lie within the scope of the claims.

What I claim is:

1. A latch hook device comprising a hook member formed of a sheet metal stamping including a flat centrally apertured hub portion formed with two peripheral notches at diametrically opposite sides of the central aperture; an apertured hub member for turning said hook member formed with wings extending from diametrically opposite sides thereof and outward from the outer end face thereof, the said face being flat and forming a seat for the hub portion of the hook member with the notches of the latter receiving the inner edges of the hub wings to key said two members to rotate together with their apertures positioned in alinement, the wings and notches being formed to adapt the hook member to be removed and reversed to render it engageable with a keeper at either side of the hub member; and a pointed screw adapted to be passed through said registering apertures of the two members, formed with a head to bear against the hub portion of the hook member and hold it upon its seat, and formed to extend beyond the opposite end of the hub member to pivotally attach both members to a support.

2. A latch hook device comprising a hook member including a centrally apertured hub portion formed with two peripheral notches at diametrically opposite sides of the central aperture; an apertured hub member for turning said hook member formed with wings extending from diametrically opposite sides thereof and outward from the outer end face thereof, the said face forming a seat for the hub portion of the hook member with the notches of the latter receiving the inner edges of the hub wings to key said two members to rotate together with their apertures in register, the wings and notches being formed to adapt the hook member to be removed and reversed to render it engageable with a keeper at either side of the hub member; and a screw adapted to be passed through said registering apertures of the two members and formed with a head to bear against the hub portion of the hook member and hold it upon its seat and formed to extend beyond the opposite end of the hub member to pivotally attach both members to a support.

3. A latch hook device comprising a hook member; a hub member adapted to be grasped for turning the hook member; a mounting for the hook member upon the hub member adapting it to be reversed upon the hub member for engagement with a keeper at either side thereof; locking means carried by said members to key them for rotation together in either adjustment of the hook member; and means to pivotally mount said two members upon a support.

4. A latch hook device comprising a hook member; a winged hub member for turning said hook member; means to lock said two members to rotate together and adapt the hook member to be reversed upon the hub member to engage a keeper at either side of the hub member; and means to pivotally mount said two members upon a support.

In testimony whereof I hereunto affix my signature.

JOHN LOUIS LANGE.